United States Patent [19]

Naka et al.

[11] Patent Number: 5,109,275
[45] Date of Patent: Apr. 28, 1992

[54] PRINTING SIGNAL CORRECTION AND PRINTER OPERATION CONTROL APPARATUS UTILIZING NEURAL NETWORK

[75] Inventors: Motohiko Naka, Kawasaki; Takehisa Tanaka, Tokyo; Mie Saitoh, Kawasaki; Toshiki Kindo; Takehiko Shida, both of Yokohama; Kunio Yoshida, Kawasaki, all of Japan

[73] Assignee: Matsushita Electric Industrial Co., Ltd., Japan

[21] Appl. No.: 635,067

[22] Filed: Dec. 28, 1990

Related U.S. Application Data

[63] Continuation-in-part of Ser. No. 493,539, Mar. 14, 1990.

Foreign Application Priority Data

Dec. 29, 1989 [JP] Japan ............................... 1-340624

[51] Int. Cl.$^5$ ............................................. G03B 27/80
[52] U.S. Cl. .................................... 358/80; 358/406;
358/75; 358/443; 364/513; 364/276.6;
364/DIG. 1; 355/326; 395/22
[58] Field of Search ................. 358/75, 80, 443, 448,
358/462, 465, 466, 305, 406, 455; 382/14, 15,
54, 33, 38; 364/513, 900, 920.7, 930–930.7,
972.4, 200, 274.9, 276.6; 355/208, 326, 327;
346/157

References Cited

U.S. PATENT DOCUMENTS

| | | | |
|---|---|---|---|
| 4,779,106 | 10/1988 | Mills | 358/406 |
| 5,014,219 | 5/1991 | White | 382/16 |
| 5,019,858 | 5/1991 | Suzuki | 355/35 |
| 5,025,282 | 6/1991 | Nakamura | 355/77 |
| 5,041,916 | 8/1991 | Yoshida et al. | 358/433 |

*Primary Examiner*—Edward L. Coles, Sr.
*Assistant Examiner*—Jill Jackson
*Attorney, Agent, or Firm*—Lowe, Price, LeBlanc & Becker

[57] ABSTRACT

An apparatus for printing signal correction and printer operation control, for use in applications such as color copiers, utilizes a neural network to convert input image signals, derived for example by scanning and analyzing an original image, into printing density signals which are supplied to a printer. In addition, a detection signal expressing at least one internal environmental condition of the printer, such as temperature, is inputted to the neural network, so that the output printing density signals are automatically compensated for changes in internal environment of the printer.

7 Claims, 7 Drawing Sheets

PRINTING SIGNAL CORRECTION AND PRINTER OPERATION CONTROL APPARATUS UTILIZING NEURAL NETWORK

The present invention is a continuation in part of a prior U.S. patent application Ser. No. 07/493,539, filed Mar. 14, 1990 titled "Color Data Correction Apparatus Utilizing Neural Network",

BACKGROUND OF THE INVENTION

1. Field of Application

The present invention relates to a printing signal correction and printer operation control apparatus for use in applications such as an image copier apparatus of a type which is capable of printing an image having at least intermediate gray-scale gradations.

2. Prior Art Technology

Figure 1:
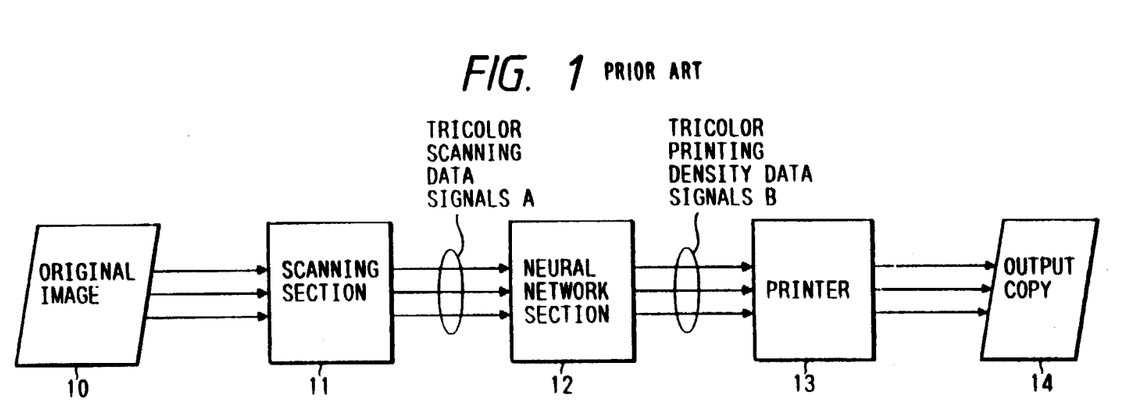
FIG. 1 is a block diagram for describing the basic principles of a printing signal correction apparatus described in a previous related patent application.

FIG. 1 is a simple block diagram showing the basic arrangement of an image copier apparatus which executes image scanning/analysis, and printing functions. For the purpose of description, it will be assumed that the apparatus of FIG. 1 is a color copier apparatus, however the basic principles are equally applicable to a monochrome copier apparatus or to a monochrome or color facsimile apparatus. It will also be assumed that the apparatus executes correction of color image analysis signals (obtained by scanning an original color image) to obtain color printing density signals for use in printing a copy of that original image, in accordance with the aforementioned U.S. application of which the present invention is a continuation in part, i.e. that the apparatus executes such correction by means of processing the image analysis signals in a neural network. A scanning/analysis section 11 serves to scan successive small regions (i.e. picture elements) of a source image 10, to obtain for each picture element a tricolor R,G, B (red, green, blue) set of primary color data values, with the flow of color data values being designated as an output scanning signal A from the scanning/analysis section 10. These data values are supplied to a neural network section 12, which executes correction of each color data value to obtain a corresponding set of printing color data values, i.e. a set of R, G, B or C, M, Y (cyan, magenta, yellow), or C, M, Y, B data values, where B is a black level component, with the flow of printing color data values being designated as an output printing signal B from the neural network section 12. The printing color data values are supplied to a printer unit 13, and the correction that is applied to each set of analysis tricolor data values in the neural network section 12 should ideally be such as to obtain a corresponding set of printing data values which will result in optimum matching between each original picture element of the source image 10 and a corresponding printed picture element of an output copy image '14 that is generated by the printer unit 13 in response to the color printing data values. That is to say, the neural network section 12 must convert each set of color analysis data values of each picture element of the original to obtain a corresponding set of printing density data values which, when supplied to a printer, will result in a picture element being printed which is close to the original picture element with respect to hue, color density, and gray-scale value. The flow of sets of printing density data values that are obtained by such conversion will be referred to in the following as the printing density signal B. The above remarks are equally applicable to a monochrome image copier system, but with only gray-scale correction being executed by the neural network section 12 in that case, to obtain the printing density signal B.

The printer unit 13 in this example is of the type whose operation is based on formation of a copy of an original image as a pattern of electrical charge on the surface of a a rotary drum having photo-conductive surface, i.e. with that charge image being formed by first charging the drum surface uniformly to a specific potential, in darkness, and then selectively discharging regions of the surface by scanning the surface with a light beam that is modulated in accordance with the color printing signal data, and with the charge image then being used to transfer to an output medium (i.e. paper sheet) an image formed of toner (pigment powder particles), and the pigment image then being "fixed", e.g. by application of heat.

In a practical apparatus, due to the respectively different speeds of operation of the scanning and analysis section 11, the neural network section 12 and the printer unit 13, the scanning data signals A and the printing density data signals B may be produced by readout from respective memories into which data generated by the scanning and analysis section 11 and the neural network section 12 respectively have been temporarily stored, and it will be assumed that such a memory is incorporated into the scanning and analysis section 11 and also into the neural network section 12. In addition, the neural network section 12 includes a parameter memory, for storing internal parameters (i.e. weighting values) of the neural network. The operation of such an apparatus is as follows. Firstly, prior to executing a "learning" operation to derive and store a set of internal parameters of the neural network section 12, with the neural network section 12 disconnected from the printer unit 13, a sample image, such as a large number of color samples (sometimes called color patches) covering a wide range of hue and gray-scale value, is printed by applying successive predetermined tricolor printing density data values to the printer unit 13. The respective sample printing density data value sets for these color patches are stored in memory. Next, the scanning and analysis section 11 is set up to successively scan the color patches, scanning is executed of all of the color patches, and the resultant values of tricolor scanning data signals A are stored in memory. Within the neural network section 12, comparators are provided for comparing the printing density data signals B produced from the neural network section 12 with respective ones of the tricolor sample data value sets that have been stored as described above. The stored values of the tricolor scanning data signals A for the first color patch are then read out from memory, to be compared with the tricolor printing density data values that were actually used to print that color patch (i.e. are compared with a set of ideal printing density values as reference values) which are read out from memory at the same time, and computations are then executed (based on an amount of error that is obtained as a result of that comparison) for correcting the internal parameters of the neural network section 12. That process is then repeated for the next color patch, and so on. When that comparison and parameter correction process has been executed for all of the color patches, it is thereafter cyclically repeated until it is determined that satisfactory values for the internal parameters of the neural network section 12 have been reached, i.e. that a sufficient degree of convergence for the values of the internal parameters of the neural network has been reached, so that the output values produced from the neural network in response to specific input values supplied thereto are sufficiently close to the corresponding reference values indicative of predetermined tricolor printing density data values.

Algorithms for executing successive correction of the internal parameters of a neural network, based on a comparison between output values from the neural network and reference data values, are well known, and no detailed discussion will be given herein.

In a practical apparatus, the neural network of the section 12 can be configured by simulating the operation of a neural network by a suitably programed microprocessor, used in conjunction with a RAM (random access memory) for implementing the various memory functions described above.

After the learning operation described above has been completed, the neural network section 12 will provide a non-linear relationship between tricolor scanning data signals A that are produced from the scanning and analysis section 11 when any arbitrary original color image 10 is scanned and the corresponding printing density data signals B that are provided by the neural network section 12, such as to result in printing operation by the printer unit 13 that produces accurate reproduction for the output copy 14, even for tone values in the original image that are intermediate between tone values of the color patches.

However with such an image copier apparatus, the relationship between the printing signal data that are supplied to the printing apparatus for a picture element and the tonal values (i.e. hue, color saturation and grayscale values in the case of color reproduction) of a picture element that is actually printed in response to the printing signal data will vary in accordance with certain internal environmental conditions of the printer unit 13. These include the temperature and humidity levels within the printer apparatus, the potential to which the drum surface is pre-charged, the degree of moisture contained in the paper that is used as the copying output medium, etc. Certain operating conditions (e.g. a drive voltage that is applied to a light-emitting element which produces a light beam that is modulated to scan the rotating drum, and the level of voltage to which the drum surface is pre-charged before scanning by that light beam) of the printer, these being referred to in the following as the settable operating values of the printer, can be manually adjusted such as to provide improved reproduction quality. It will thereafter not be necessary to change these settable operating values so long as the internal environmental conditions of the printer are not changed. However it will be necessary for the operator of such an apparatus to manually execute adjustment of these settable operating values each time that the apparatus is used in a different operating environment (e.g. is moved to a warmer room, for example). This is a disadvantage of such an apparatus.

Moreover, with the apparatus example of FIG. 1, the values of neural network internal parameters that are derived by the aforementioned "learning" operation using a large number of color samples may only provide accurate reproduction when the apparatus is used with internal environmental conditions that are close to those under which the "learning" operation was executed. That is to say, if the apparatus is later transferred for example to a warmer or colder room, then it may be necessary to repeat the neural network internal parameter learning process in order to obtain a new set of internal parameters which will provide accurate reproduction, i.e. in order to counteract the effects of the change in internal environmental conditions of the printer upon the printing process. Thus, whenever there is a substantial change in the internal environmental conditions of the printer, it may be necessary to not only adjust the settable, operating values of the printer, but also to repeat a neural network learning operation.

Thus, it is difficult to achieve consistently high quality of reproduction, even in the case of an apparatus of the type described above in which a neural network is used to derive the printing density data signals B from the tricolor scanning data signals A.

SUMMARY OF THE INVENTION

It is an objective of the present invention to overcome the disadvantages of the apparatus of FIG. 1 as set out above, by providing an image copier apparatus including scanning and analysis means for deriving image scanning data signals from an original image and a printer apparatus for printing a copy of that original image, in which a neural network is utilized to correct image scanning data signals to obtain printing density data signals and in which signals indicative of at least one internal environmental condition of the printer apparatus are inputted to the neural network together with the image scanning data signals, such that the printing density signal values that are outputted from the neural network will be determined based on not only the image analysis values but also one or more internal environmental conditions of the printer. This is made possible by executing the "learning" operation for establishing values for the internal parameters of the neural network by varying not only the image analysis data values that are inputted to the neural network during that "learning" but also by inputting to the neural network a plurality of respectively different data values representing different values of at least one internal environmental condition of the printer. By executing the "learning" operation for each of a plurality of different sets of image analysis data values each derived by scanning a sample image which was previously printed out under a certain internal environmental condition, while inputting to the neural network data representing the internal environmental condition of the printer at the time of printing that sample image, it becomes possible to establish internal parameters for the neural network whereby substantially accurate values of printing density signal will be produced thereafter from the neural network, for reproduction of arbitrary images under arbitrary internal environmental conditions, e.g. at various different internal temperatures of the printer, which lie within a range of temperatures for which internal parameter "learning" by the neural network was previously executed.

Moreover, with a preferred embodiment of the present invention, the internal parameter "learning" operation of the neural network is executed such that data for controlling at least one settable operating value of the printer, such as the aforementioned light-emitting element drive voltage, are outputted from the printer, so that such an settable operating value can be automatically set close to an optimum value, irrespective of changes in the aforementioned internal environmental condition whose value is inputted to the neural network.

More specifically, according to a first aspect, the present invention provides a printing signal correction and printer operation control apparatus for executing correction computations on values of an image data signal representing successive picture elements of an original image, for obtaining a printing density data signal to be supplied to printer means to produce a copy of the original image, comprising:

a neural network;

a parameter memory for storing internal parameters of the neural network;

sensor means for detecting at least one internal environmental condition of the printer means and for producing a detection signal having a value indicative of the internal environmental condition;

wherein the neural network is coupled to receive the image data signal and the detection signal as respective input signals, and executes computations on each of successive combinations of values of the image data signal and detection signal to produce corresponding values of the printing density data signal, and wherein respective values for the neural network internal parameters are determined by a procedure which includes inputting to the neural network successive pluralities of sample values of image data signal under respectively different ones of the printer internal environmental conditions, while also inputting to the neural network detection signal values respectively indicative of the different internal environmental conditions, and comparing resultant printing density data signal values produced from the neural network with respectively corresponding actual printing density data signal values.

According to a second aspect, the neural network further produces as an output signal at least one settable operating value for controlling an operating condition of the printer means, and wherein during the procedure for determining values of the neural network internal parameters, the settable operating value produced from the neural network is compared with an ideal settable operating value, and comparison results obtained thereby are utilized in obtaining the internal parameter values.

DESCRIPTION OF PREFERRED EMBODIMENTS

Figure 2:
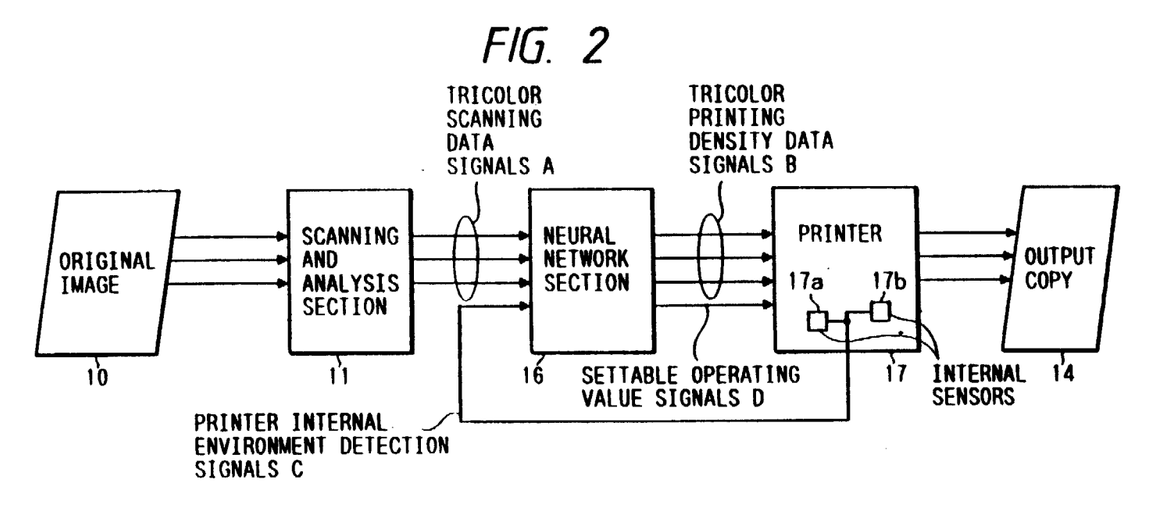
FIG. 2 is a block diagram for describing the basic principles of an embodiment of an apparatus according to the present invention for printing signal correction and printer operation control.

FIG. 2 is a block diagram for describing the basic principles of an image copier apparatus which is based on a first embodiment of an image signal correction and printer control apparatus according to the present invention. As for the example of FIG. 1, during normal operation of the apparatus, an original image 10 is scanned by a scanning and analysis section 11 (e.g. by a scanning light beam, with light reflected from the original image 10 being received by optical sensors) and data for successive picture elements of the original image 10 are thereby obtained and analyzed to obtain respective sets of tricolor scanning data signals A. These are supplied to a neural network section 16, which is based on a neural network which operates on each set of tricolor scanning data values to derive a corresponding set of printing density data values, to be supplied to a printer unit 17, which thereby prints an output copy 14. However this embodiment differs from the example of FIG. 1 described above in that printer environment detection signals C are produced from the printer unit 17, and are inputted to the neural network section 16. The printer environment detection signals C are generated by internal sensors within the printer unit 17, and can for example be signals whose levels respectively indicate the temperature within the printer unit 17, the humidity within the printer unit 17, etc. The embodiment of FIG. 2 further differs from the example of FIG. 1 in that settable operating value signals D are produced from the neural network section 16, and supplied to the printer unit 17. These settable operating value signals D control at least one of the aforementioned settable operating values, i.e. can for example be signals whose respective levels determine a level of DC drive voltage applied to a light-emission element which produces a light beam that is modulated in accordance with image data and scanned over the photoconductive layer the rotary drum of the printer, and the level of pre-charge voltage which is applied to the photoconductive surface of the rotary drum before scanning by the modulated light beam.

Figure 3A:
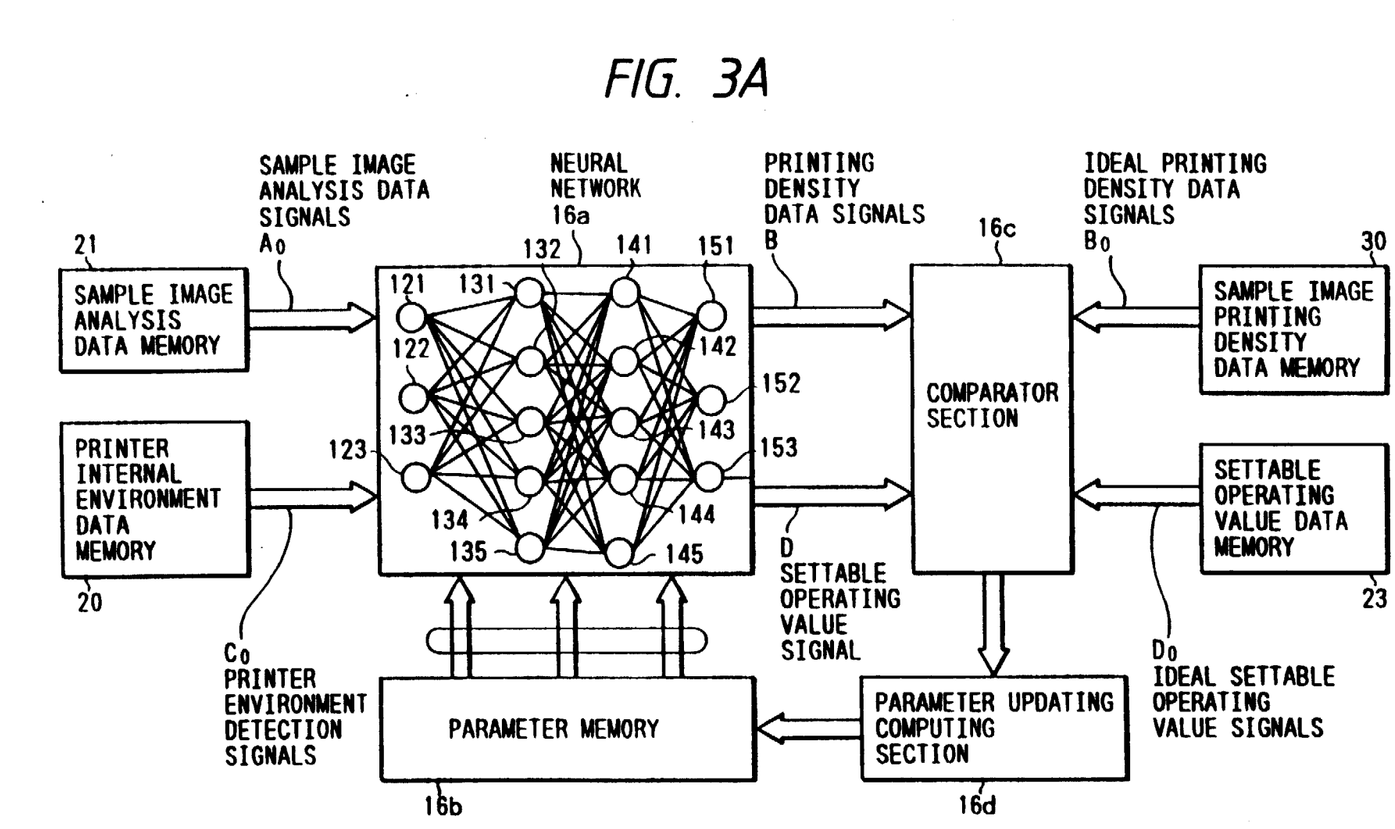
FIG. 3A is a conceptual block diagram of a system for executing an internal parameter "learning" operation for a neural network of the embodiment of FIG. 2.

FIG. 3A is a diagram for use in describing the neural network learning operation of this embodiment of the invention. The neural network section 16 of FIG. 1 is based on a neural network 16a, and also includes a parameter memory 16b in which values of internal parameters (i.e. weighting values that are assigned to respective inputs of a set of neuron elements of the neural network, these elements being conceptually indicated by circles 121 to 153 in the neural network 16a) are stored. The neural network section 16 further includes a comparator section 16c and parameter updating computing section 16d. The neural network consists of a number of layers of neural elements, e.g. the four layers made up of the elements 121 to 123 (the input layer), the elements 131 to 135, the elements 141 to 145, and the elements 151 to 153, the latter being the output layer. Input signals (in practice, successive digital data values) are supplied to neuron elements of the input layer, and processed output signals are outputted from the elements of the output layer. During the learning operation, various values of sample image analysis data signals A0 and printer environment detection signals C0 (produced as described hereinafter from a sample image analysis data memory 21 and printer internal environment data memory 20 respectively) are inputted to the neural network 16a, and resultant output signals produced from the neural network are compared in the comparator section 16c with corresponding reference signals, i.e. ideal printing density data signals B0 and ideal settable operating value signals D0 respectively. Based on the results of the comparison, which are outputted from the comparator section 16c to the parameter updating computing section 16d, corrected values of the internal parameters of the neural network are computed by the parameter updating computing section 16d and then stored in the parameter memory 16b, with such comparison and correction operations being repetitively executed until satisfactory values for the internal parameters are obtained.

Figure 3B:
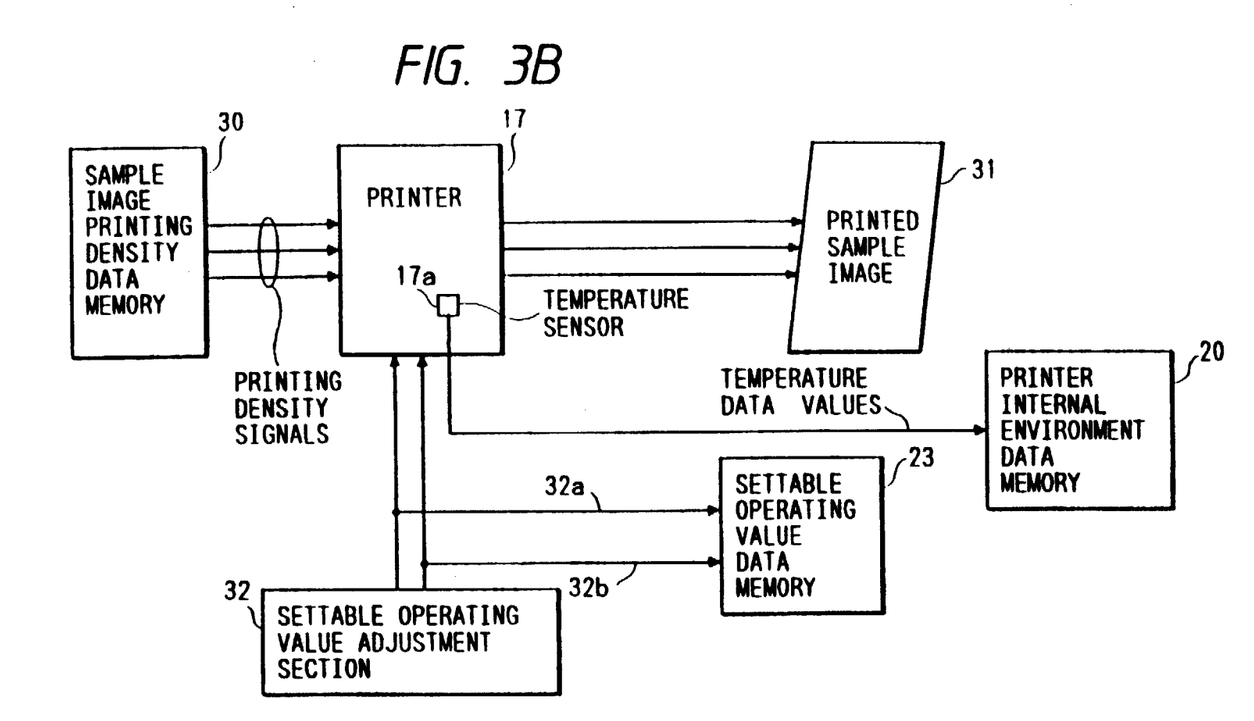
FIG. 3B is a block diagram of a system for deriving data values to be stored in memory and a plurality of sample images, prior to a neural network internal parameter "learning" operation, to be utilized during that operation.

More specifically, the learning process, to obtain suitable values for the internal parameters of the neural network, to be stored in the parameter memory 16b for subsequent use, can be executed as follows. It will be assumed that each source of the signals A0, B0, C0 and D0 is a memory from which previously derived data values are read out during the learning operation, as the sample image analysis data signals A0, printer environment detection signals C0, ideal printing density data signals B0 and ideal settable operating value signals D0 respectively. Thus, prior to executing the neural network internal parameter learning operation, it is necessary derive data values for use in generating these signals A0, B0, C0 and D0 shown in FIG. 3A. To do this, a source of printing density data values for use in printing a sample image is coupled to supply printing density signals to the printer unit 17, as illustrated in FIG. 3a (in which the source consists of a memory 30 having suitable printing density data values stored therein beforehand) with the printer unit 17 disconnected from the neural network section 16. It will be assumed that the sample image consists of an array of color patches which cover a suitably wide range of hue, color saturation and gray-scale values. However it would be equally possible to use printing density data values for printing a picture which covers a wide tonal range, as that sample image. In addition, a settable operating value adjustment section 32 is coupled to input settable operating value data to the printer unit 17, via lines 32a, 32b, and a settable operating value data memory 23 is also coupled to receive and store these settable operating value data.

The printer unit 17 is now set in a specific environmental condition. For example, if only internal printer temperature is to be detected (by the aforementioned internal sensors of the printer unit 17) and utilized to generate the printer environment detection signals C, then the printer unit 17 could be placed within a temperature-controlled chamber, at a first predetermined temperature. If in addition the internal humidity of the printer unit 17 is to be detected and the detection signal to be used as part of the printer environment detection signals C, then the printer unit 17 could be placed within a chamber in which both temperature and humidity are controllable. However for simplicity of description it will be assumed in the following that only the internal temperature of the printer is detected. In that condition, the level of the temperature detection signal produced by the temperature sensor 17a of the printer unit 17 is stored in the printer internal environment data memory 20, then data for at least one settable operating value of the printer unit 17 is adjusted by manual operation of the settable operating value adjustment section 32 (where the settable operating value data can for example consist of a data value which determines a level of DC drive voltage applied to a light-emitting element used to derive a light beam which is modulated in accordance with image data, for scanning the rotary drum of the printer, and a data value which determines the level of the rotary drum surface precharge voltage), until a condition is reached at which optimum image quality is achieved for the printer unit 17. This adjustment to determine suitable settable operating values can in practice be executed by printing out successive copies 31 of the sample image by using the aforementioned predetermined printing density data values, and adjusting the settable operating value data after each printout (in a direction such as to obtain improved output printed image quality) until no further improvement is found possible. The settable operating value data thus obtained are stored in the settable operating value data memory 23. In addition, the final sample image 31 that has thus been printed is now scanned by the scanning and analysis section 11, and the resultant sets of printing density data values obtained for the respective color patches are stored in the sample image analysis data memory 21. It will be assumed for ease of understanding that the sample image consists of an array of color patches, and that during this scanning by the scanning and analysis section 11, respective sets of tricolor data values for the various color patches are successively stored in the sample image analysis data memory 21.

The internal temperature of the printer unit 17 is then changed to a different value, and the above process is repeated to obtain new settable operating values, which are again stored in correspondence with the temperature detection signal level. In addition, the set of color patches that is printed out under this new internal environmental condition of the printer is scanned, and the resultant tricolor scanning data values printing density data values are stored in the sample image analysis data memory 21. Such operations must be executed for at least two different internal environmental conditions (e.g. at least two different internal temperature values in this example), and the greater the number of internal environmental conditions utilized, the more accurate will be the finally obtained reproduction results, at internal temperature values which are intermediate between those used in the parameter learning process. In addition, such operations are preferably repeated cyclically over the plurality of internal environmental conditions a number of times, to optimize the neural network parameter values.

In general, there will be differences between the sample image copies that are printed under different internal environmental conditiosn. For example the color balance may vary between the various printed sample image copies, as a result of the effects of operating the printer at different conditions of internal temperature using a fixed set of printing density data values for printing the sample image in each case, and it is not necessary to be able to completely correct for such variations between the different printed sample images by adjustment of the settable operating values.

Figure 4:
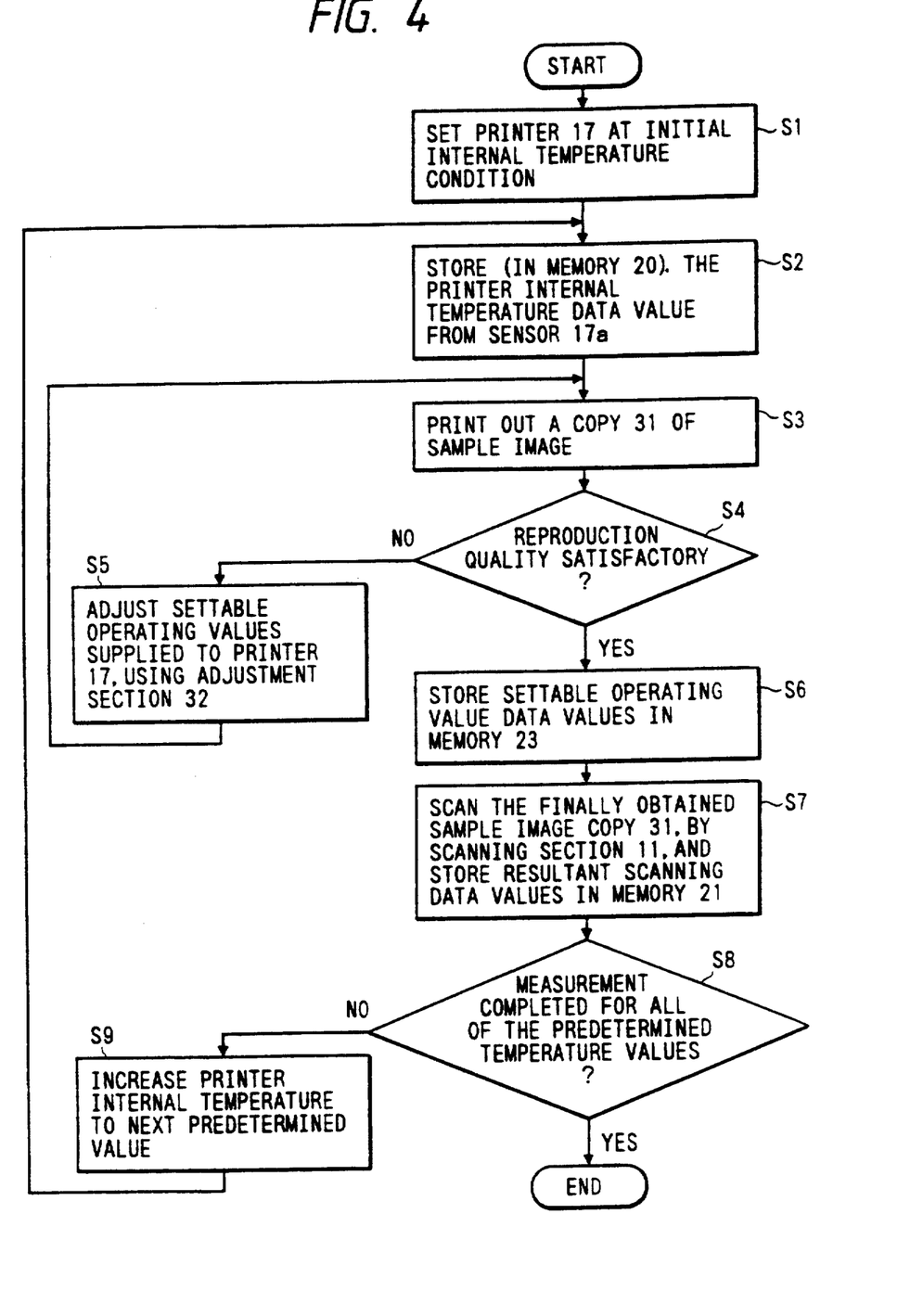
FIG. 4 is a flow diagram for illustrating the operation of the system of FIG. 3B.

FIG. 4 is a flow diagram for illustrating the control operations that are executed in order to obtain the data that are stored in the sample analysis data memory 21, printer internal environment data memory 20, and settable operating value data memory 23 as described above, prior to a neural network internal parameter learning operation, for the case in which only internal temperature of the 17 is sensed and utilized for control purposes. In step S1 the printer unit 17 is set to an initial internal temperature value, that value is stored in step S2, then by supplying to the printer unit 17 the printing density data values that have been stored beforehand in the sample image printing density data memory 30, a first copy 31 of the sample image is printed out. A judgement is then made as to whether the reproduction quality of that copy is satisfactory. That judgement can be made by an operator, or it may be possible to provide some apparatus for automatically making such a judgement. If the quality is not satisfactory, then data for determining one or more settable operating values of the printer unit 17 are varied (in step S5), another copy of the sample image is then printed, and judgement of the quality is again executed. When the quality of the sample image copy 31 is found to be satisfactory (i.e. optimum values have been reached for the settable operating value data), these settable operating value data are stored in the settable operating value data memory 23 (step S6), and that sample image copy 31 is then scanned and analyzed by the scanning and analysis section 11, to obtain sets of tricolor data values for each of the color patches constituting the sample image (or for each of successive picture elements, in the case of an arbitrary image being used as the sample image), and the data values thus obtained are stored in the sample image analysis data memory 21. The above is then repeated if necessary, after the printer unit 17 has been set to a new value of internal operating temperature (in step S9), and the above process is repeated to obtain image analysis data for that new temperature value.

Although the above description has assumed that special facilities are provided for controllably changing the internal temperature of the printer unit 17, if internal temperature alone is to be detected as an internal environmental condition then it may be possible to utilize the natural temperature variations that accompany "warm-up" of the apparatus after power is switched on, for use in obtaining the optimum settable operating values for two or more different internal environmental conditions of the printer as described above. In that case, step S1 of the flow chart of FIG. 4 could be altered to "switch on power to the printer", and step S9 could be altered to "wait until printer internal temperature increases to the next predetermined value (as the printer "warms up")"; however the principles of operation are identical to those for the case in which a heating chamber is used to forcibly alter the internal temperature of the printer unit 17.

The parameter learning operation, for establishing suitable values of the internal parameters of the neural network 16a, is executed as follows. The sample image printing density data memory 30 is again used, used as a source of printing density data values that were actually used in printing copies of the sample images as described above. The first of the internal environmental condition values (i.e. temperature detection values) to have been obtained as described above is read out from the printer internal environment data memory 20, as the printer environment detection signals C0, and inputted to the neural network 16a. In addition, the first of the sets of tricolor scanning data values obtained (from the printed color patches constituting the sample image as described above) for that internal environmental condition are read out from the sample image analysis data memory 21 as the sample image analysis data signals A0, and supplied to the neural network 16a. At this point the internal parameters of the neural network 16a can be arbitrarily set values, or can be values that have been established as approximately correct based on previous experience. The neural network then processes the input sample image analysis data signals A0 and printer environment detection signals C0, in accordance with these initial internal parameter values, and outputs the resultant data values from the neural network, as the printing density data signal B and the printer operation control signal D. A resultant set of printing density data values are thereby outputted from the neural network 16a, as the signal B, and at the same time, the corresponding printing density data value (i.e. that was previously used to print that first color patch) is read out from the sample image printing density data memory 30, as the reference signal B0, and the output signal value D from the neural network is compared with that value of signal B0. In addition, at the same time, the neural network produces an output value of settable operating value data, as the settable operating value signals D, and the stored value of settable operating value corresponding to the value of internal environmental condition (temperature) data that is being inputted to the neural network at that time is read out from the settable operating value data memory 23 as the ideal settable operating value signals D0, and is compared with the output value of signal D from the neural network. Based on the results of these comparisons between the values of the printing density data signals B and ideal printing density data signals B0 and between the values of settable operating value signals D and ideal settable operating value signals D0, computations are executed by the parameter memory 16b for obtaining corrected values for the internal parameters of the neural network 16a, and the corrected values are then stored in the parameter memory 16b. The above process is then repeated for the next color patch data, read out from the sample image analysis data memory 21, and so on. As is described in literature relating to such neural networks, corrected values for the the internal parameters for the inputs of the output layer of the network are first computed, then based on these and the comparison results, corrected values are computed for the next-but-last layer of neuron elements, and so on to the input layer.

The above operations are successively repeated for each of the sets of tricolor scanning data values of the various color patches of the sample image 31, to obtain successively improved values of the internal parameters, then the operations are cyclically repeated over all of these color patches, until the values of the output signals B, D from the neural network 16a become sufficiently close to the reference values B0, D0 respectively. The values of neural network internal parameters derived at that stage are then left stored in the parameter memory 16b.

The above learning process is then repeated for the next internal environmental condition, i.e. the mutually corresponding values that have been stored in the printer internal environment data memory 20 and the settable operating value data memory 23 are read out and inputted to the neural network 16a, and the sample color data values that have been stored in the sample image analysis data memory 21 for that internal environmental condition are successively read out together with the corresponding printing density data values that were stored in the sample image printing density data memory 30 and the process described above is executed to obtain new values of neural network internal parameters (starting from the values of internal parameter that were left stored in the parameter memory 16b from the preceding learning operation). If more than two internal environmental conditions (e.g., in the simplest case, three different operating temperatures for the printer) are being utilized, then the above learning process is then again repeated for the next value of printer internal temperature, read out from the printer internal environment data memory 20. Preferably, these successive learning operations for the different internal environmental conditions of the printer unit 17 should be cyclically repeated a number of times over all of the internal environmental conditions, to optimize as far as possible the final values establisehd for the neural network internal parameters.

Figure 5A:
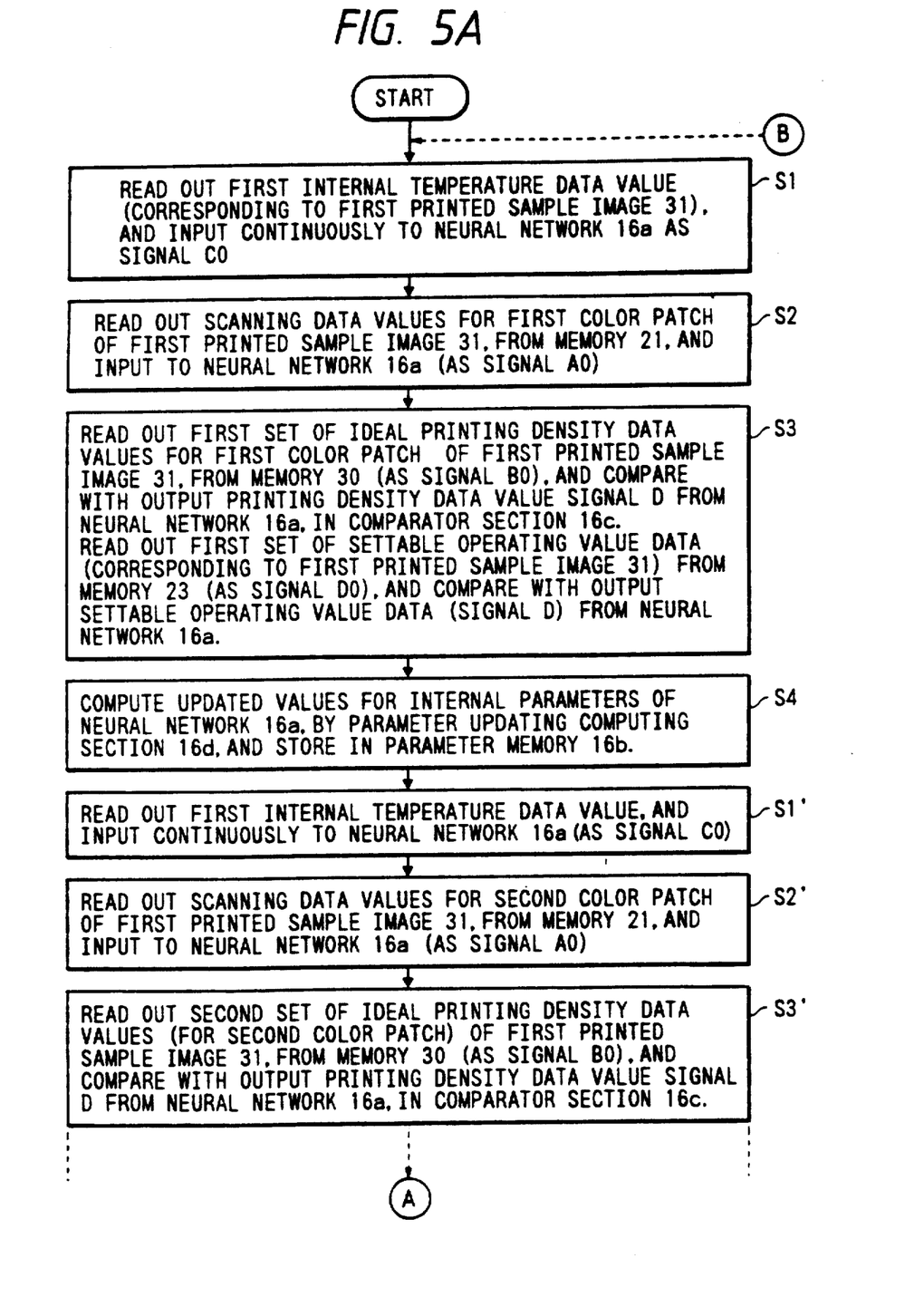
FIGS. 5A, 5B constitute a flow diagram for illustrating the neural network internal parameter "learning" of the embodiment of FIG. 2.
Figure 5B:
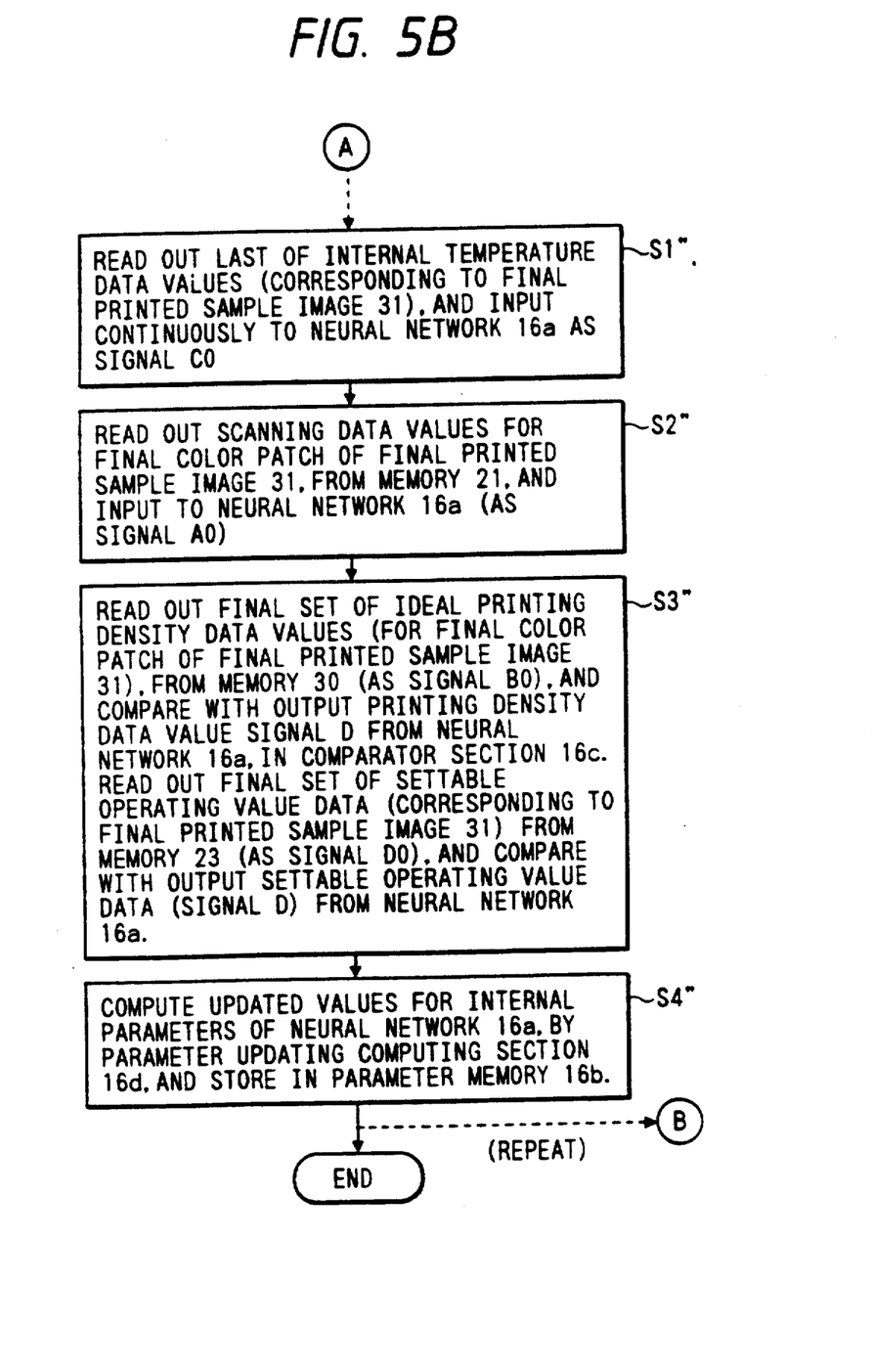

FIGS. 5A, 5B constitute a flow diagram for illustrating the overall processing flow during the neural network internal parameter learning operation described above. In steps S1, S2, image data for a first sample color patch of the first sample image copy 31 to have been obtained and scanned (as described above referring to FIG. 4), and the corresponding printer internal environmental condition data (in this example, internal temperature data) are read out from the sample image analysis data memory 21 and printer internal environment data memory 20 respectively, and inputted to the neural network 16a in FIG. 3A. In step S3, the printing density data values that were actually used to print that color patch are read out from the sample image printing density data memory 30, and compared with the printing density data values that are produced from the neural network 16a as a result of processing executed on the aforementioned input image scanning data and internal temperature data values. At the same time, the settable operating value data values that were established for that internal temperature value of the printer are read out from the settable operating value data memory 23, to be compared with the settable operating value data values that are outputted from the neural network 16a. Based on the results of the comparisons, the parameter updating computing section 16d then computes corrected values for the neural network internal parameters (step S4). The above process is then repeated for the next color patch of that sample image copy 31 (step S2', S3', . . . ), and comparisons executed for further correcting the neural network internal parameters, and so on for all of the color patches of that sample image copy. The above process is then repeated for the image data that were stored in the sample image analysis data memory 21 for the second sample image copy (i.e. obtained at a second value of printer internal temperature), to further correct the neural network internal parameter values, and so on to data obtained for the final sample image copy, in steps S1" to S4".

It can be understood that the above neural network internal parameter learning process can be controlled by an overall system controller (implemented as a microprocessor).

The settable operating value adjustment section 32 may include devices such as manually adjustable switches or potentiometers which produce output data values to be are supplied to the printer unit 17 for determining respective settable operating values of the printer unit 17, with respectively different sets of such data representing these settable operating values being stored in the memory 23 for each of the internal environmental conditions of the printer as described hereinabove, prior to the start of the neural network learning process.

In a practical apparatus, the neural network 16a may be implemented as a simulated neural network by the operation of a single microprocessor, while control of the neural network learning process and and overall control functions may be executed by one or more additional microprocessors.

Thereafter, any arbitrary original image can be copied by the above embodiment of the invention, having the configuration shown in FIG. 2. With the values of neural network internal parameter that have been "learned" by the learning process described above, set into the neural network, an original image is scanned by the scanning and analysis section 11 to obtain tricolor scanning data values for all of the image, which are stored in memory. These are then read out and inputted, together with the current values of internal environmental condition of the printer unit 17 (i.e. the printer internal temperature, if that alone has been used in the neural network internal parameter learning process) to the neural network section 16. The resultant printing density data signals B and settable operating value signals D from the neural network section 16 are thereby outputted from the neural network, to be supplied to the printer unit 17, which thereby prints an output copy of the original image. In that printing operation, the printing density data values that are supplied to the printer have been determined by the neural network such as to be accurate irrespective of variations in the aforementioned internal environmental condition or internal environmental conditions (e.g. internal temperature of the printer), due to the printer environment detection signals C being inputted to the neural network. That is to say, if for example a region in the original image is identical in hue, color density and gray-scale value to one of the aforementioned color patches used in the neural network learning process, and if the internal temperature of the printer is identical to one of the predetermined temperature values that was used in that learning process, then ideally (i.e. assuming an ideal neural network for which ideal correction of the internal parameters has been achieved by the learning process) it will be apparent that the corresponding region of the output copy 14 would be exactly identical to the region in the original image. This would be true, since the same settable operating value data and printing density data values would be supplied to the printer unit 17 as were supplied at the time of printing the corresponding color patch.

In practice of course such ideal operation cannot be expected, however it is found that by comparison with an apparatus in which such compensation for variations in internal environmental conditions of the printer is not thus automatically executed, a substantial increase in image reproduction accuracy can be achieved for image tone values within the range of values of the sample image (or sample images) used in the neural network internal parameter learning process and for internal environmental conditions within the range of internal environmental conditions used in that learning process.

In a practical apparatus, the scanning and analysis section 11 will include a memory for storing all of the tricolor data values obtained by scanning an original image, with these data values being then read out from the memory as the tricolor scanning data signals A.

Similarly, the neural network section 16 will include a memory for storing the printer condition setting data and all of the printing density data values for that original image that are outputted from the neural network, with these data values then being read out as the settable operating value signals D and the printing density data signals B.

Figure 6:
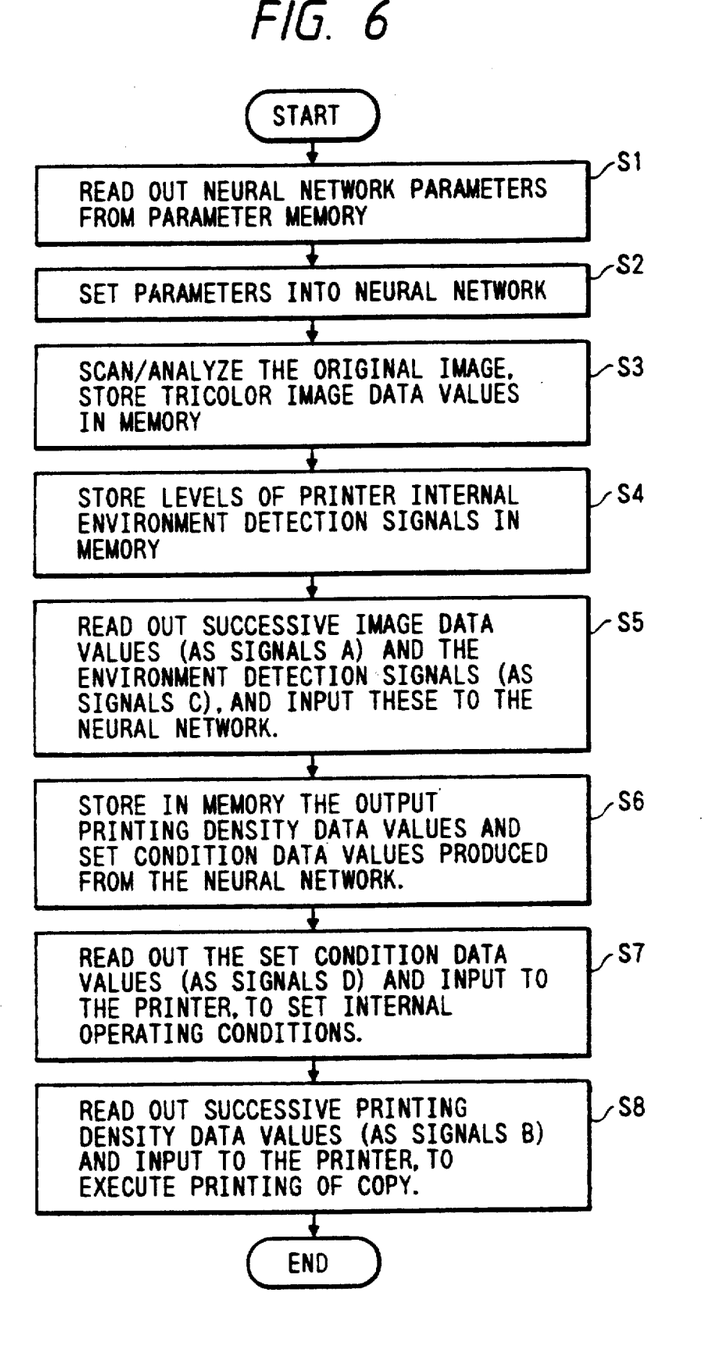
FIG. 6 is a flow diagram for illustrating the operation of reproducing an original image by the embodiment of FIG. 2, after neural network internal parameter "learning" has been completed.

FIG. 6 is a flow diagram illustrating the operating sequence of the above embodiment for reproducing an original image. In steps S1, S2, the neural network internal parameters which were established by the paramter learning process described above are read out from the parameter memory and the network set in a condition for executing computations based on these parameters. In step S3, the original image is scanned and analyzed by the scanning and analysis section 11 to obtain tricolor data values for all picture elements of the original image, and these are successively stored in memory. In step S4, the value of one or more current internal environmental conditions for which compensation is applied by the neural network (e.g. printer internal temperature) is stored in memory. (This step could of course be omitted, i.e. the internal environmental condition value or values could be continuously directly inputted to the neural network as the signal C.) In step S5, these stored image data and internal environmental condition data are read out and inputted to the neural network, as the signals A and C. In step S6 the resultant printing density data values and settable operating value data produced from the neural network are stored in memory. In step S7, the condition setting data are read out, as the signal D, and supplied to the printer unit 17, for establishing optimum settable operating values in accordance with the current internal environmental condition of the printer. In step S8, the stored printing density data values are successively read out from memory, and supplied to the printer unit 17 as the printing density data signals B, to thereby produce a printed copy of the original image.

Although with the preferred embodiment of the present invention described above, the neural network section 16 produces the settable operating value signals D in addition to the printing density data signals B, it would be possible, as a second embodiment of the present invention, to configure a system in which the signal settable operating value signals D is not produced from the neural network but which is otherwise identical to the above embodiment. In that case, a single set of settable operating values that are an optimum compromise over the entire range of internal environmental conditions in which the printer unit 17 is to be used would first be determined (e.g. by successively printing out trial copies of a sample image as described hereinabove), and used thereafter in the neural network internal parameter learning process. The settable operating value data memory 23 would then only store that single set of settable operating values, while the process of deriving data values to be stored in the printer internal environment data memory 20 and the sample image analysis data memory 21 prior to the neural network internal parameter learning operation would otherwise be identical to that described hereinabove for the first embodiment. This would provide some, but not all, of the advantages of improved image reproduction accuracy under varying internal environmental conditions of the printer that are provided by the first embodiment.

The first embodiment was described in the above for the case of printer internal temperature being the only internal environmental condition of the printer that is detected and utilized for neural network compensation, by being supplied as a value of the signal C. However it would be equally possible to utilize a combination of various internal factors of the printer as such printer internal environment detection values, including humidity, degree of moisture in the paper that is used to produce output copies, the level of pre-charge voltage to which the rotary drum of the printer is charged, etc., so long as each of these is set to a plurality of different values, and respective copies of the sample image are printed out for these different values (as described hereinabove referring to FIG. 3A), and these values (detected by respective sensing devices) are stored in memory when each sample image copy is printed and are thereafter used during the neural network internal parameter learning process as reference values for comparison with corresponding output values produced from the neural network, in a similar manner to that described above for the case of printer internal temperature being the only environment detection value.

What is claimed is:

1. A printing signal correction and printer operation control apparatus for executing correction computations on values of an image data signal representing successive picture elements of an original image, for obtaining a printing density data signal to be supplied to printer means to produce a copy of said original image, comprising:

a neural network;

a parameter memory for storing internal parameters of said neural network;

sensor means for detecting at least one internal environmental condition of said printer means and for producing a detection signal having a value indicative of said internal environmental condition;

wherein said neural network is coupled to receive said image data signal and said detection signal as respective input signals, and executes computations on each of successive combinations of values of said image data signal and detection signal to produce corresponding values of said printing density data signal, and wherein respective values for said neural network internal parameters are determined by a procedure which includes inputting to said neural network successive pluralities of sample values of image data signal under respectively different ones of said printer internal environmental conditions, while also inputting to said neural network detection signal values respectively indicative of said different internal environmental conditions, and comparing resultant printing density data signal values produced from said neural network with respectively corresponding ideal printing density data signal values.

2. An apparatus according to claim 1, in which said different ones of said internal environmental conditions include at least one of a set of conditions including internal temperature of said printer means, internal humidity of said printer means, a level of electrical charge established on a surface of a rotary drum of said printer means, and a level of moisture contained in paper utilized as a copy medium in said printer means.

3. An apparatus according to claim 1, in which a fixed set of printing density data values are inputted to said printer means, at each of a plurality of different internal environmental conditions of the printer means, to obtain respective sample images, and in which said sample images are scanned and analyzed during said procedure to determine the neural network internal parameters, for thereby generating said pluralities of sample values of image data, and in which said fixed set of printing density data values are used as said ideal printing density data values during said procedure.

4. An apparatus according to claim 1, wherein said neural network further produces as an output signal at least one settable operating value for controlling an operating condition of said printer means, and wherein during said procedure for determining values of said neural network internal parameters, said at least one settable operating value produced from said neural network is compared with an ideal settable operating value, and comparison results obtained thereby are utilized in obtaining said values of said internal parameters.

5. An apparatus according to claim 4, in which said different ones of said internal environmental conditions include at least one of a set of conditions including internal temperature of said printer means, internal humidity of said printer means, a level of electrical charge established on a surface of a rotary drum of said printer means, and a level of moisture contained in paper utilized as a copy medium in said printer means.

6. An apparatus according to claim 4, in which said at least one settable operating value includes at least one of a set of operating values including a value of voltage applied to drive a light-emitting element for scanning a rotary drum of said printer means, and a value of voltage to which a rotary drum of said printer means is charged prior to scanning by light emitted by said light-emitting element.

7. An apparatus according to claim 4, in which a fixed set of printing density data values are inputted to said printer means, at each of a plurality of different internal environmental conditions of the printer means, to obtain respective sample images, and in which said sample images are scanned and analyzed during said procedure to determine the neural network internal parameters, for thereby generating said pluralities of sample values of image data, and in which said fixed set of printing density data values are used as said ideal printing density data values during said procedure.

* * * * *